Figure 1:
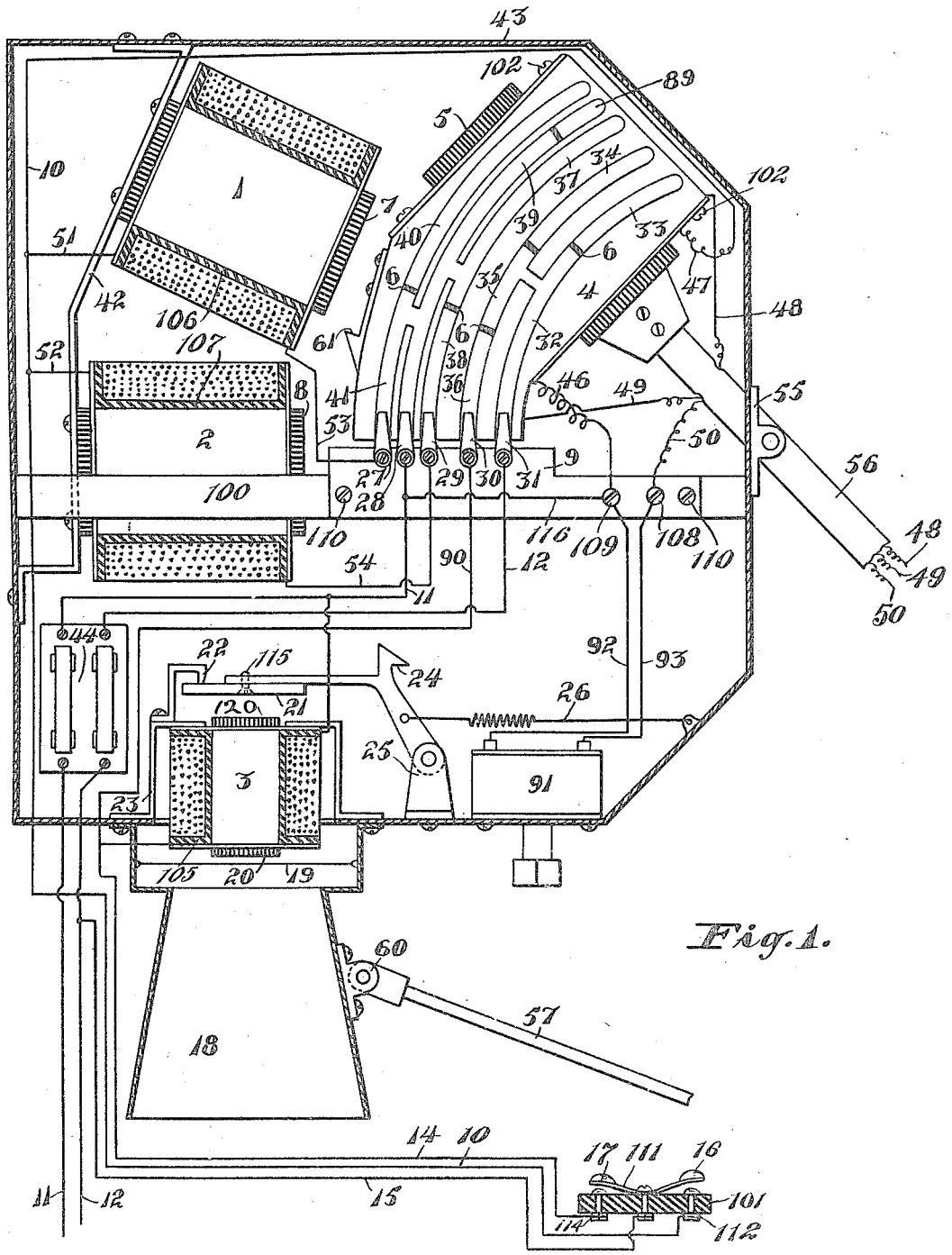

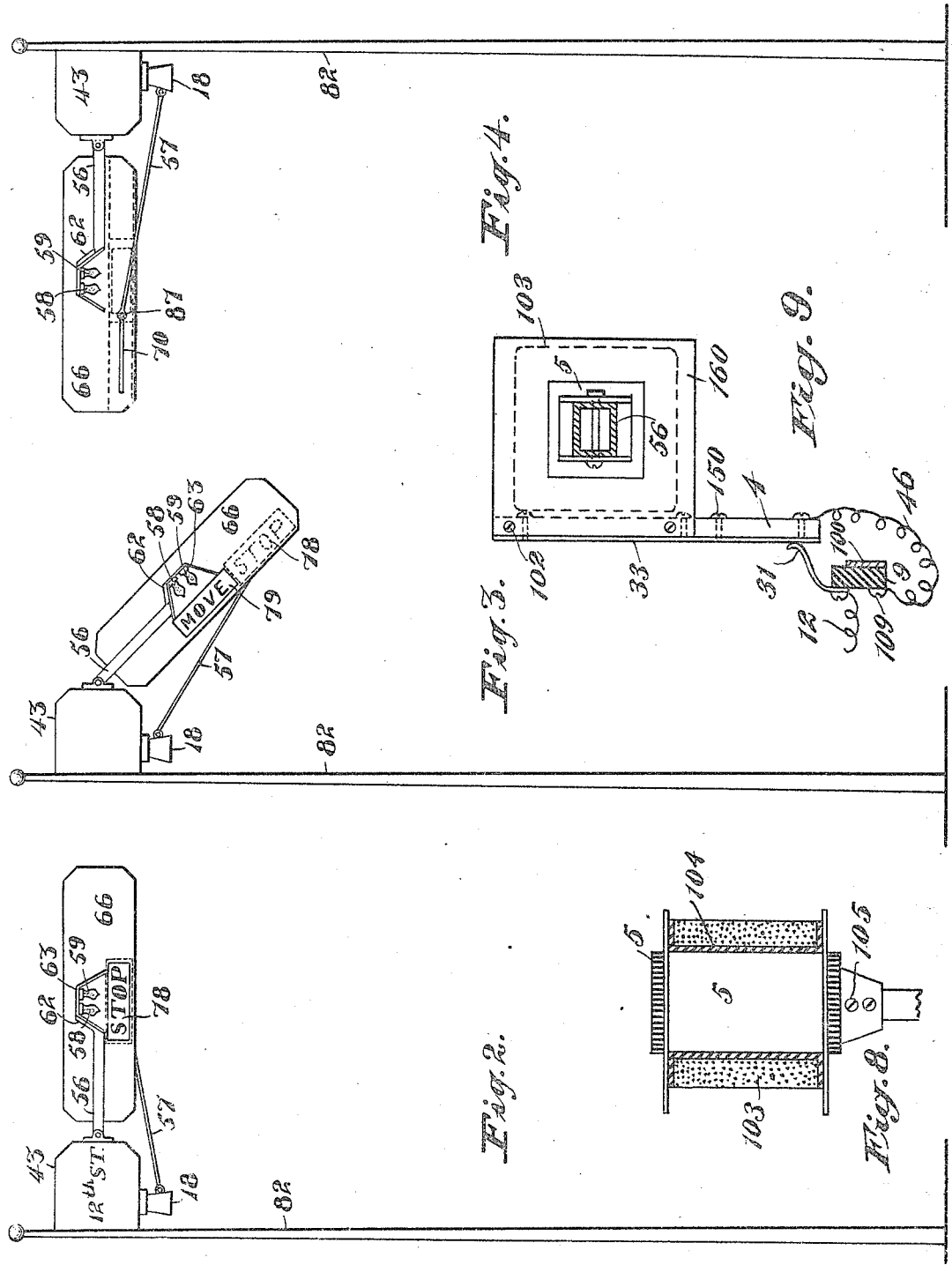

J. G. WALLMANN.
APPARATUS FOR REGULATING STREET TRAFFIC.
APPLICATION FILED MAR. 24, 1914.
Patented May 23, 1916.
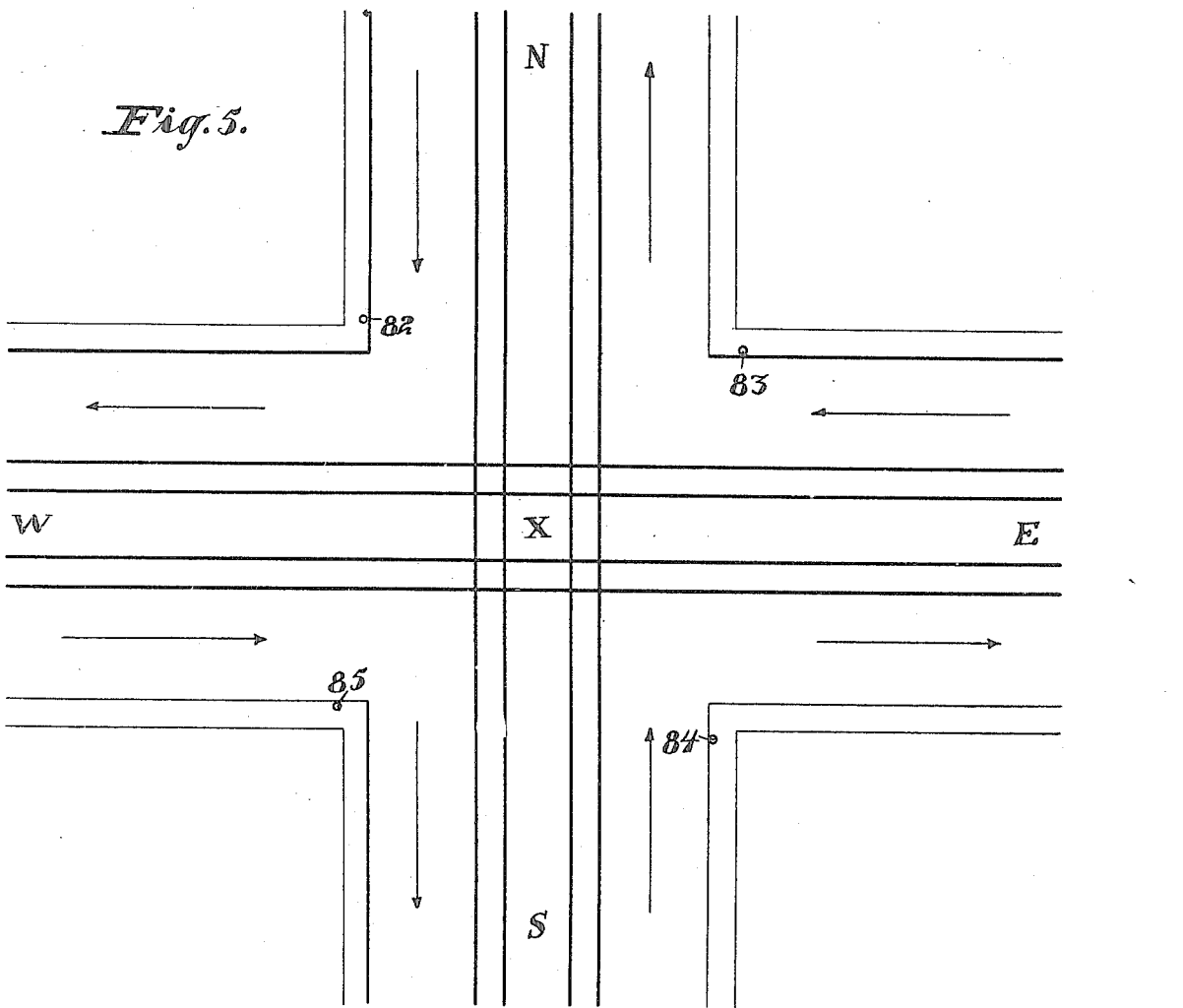
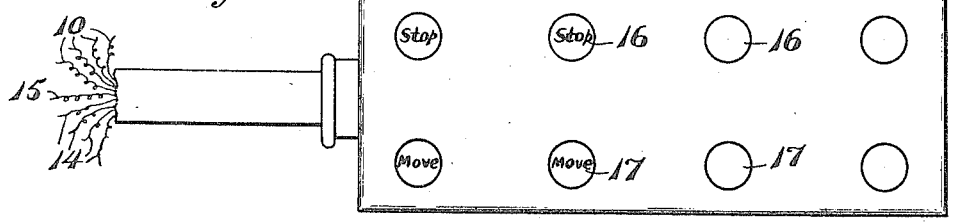
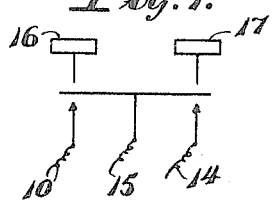
WITNESSES:
INVENTOR.
Johann G. Wallmann
BY Lincoln Sonntag,
ATTORNEY

UNITED STATES PATENT OFFICE.

JOHANN G. WALLMANN, OF OAKLAND, CALIFORNIA, ASSIGNOR OF ONE-THIRD TO CHARLES A. McCANN, OF BERKELEY, CALIFORNIA, AND ONE-THIRD TO JOHN GEORGE SHERRY, OF OAKLAND, CALIFORNIA.

APPARATUS FOR REGULATING STREET TRAFFIC.

1,184,597.      Specification of Letters Patent.      Patented May 23, 1916.

Application filed March 24, 1914. Serial No. 826,895.

*To all whom it may concern:*

Be it known that I, JOHANN G. WALLMANN, a citizen of the United States, residing at the city of Oakland, in the county of Alameda and State of California, have invented certain new and useful Improvements in Apparatus for Regulating Street Traffic, of which the following is a specification.

My invention relates to apparatus for regulating street traffic.

The object of my invention is to provide an apparatus for regulating street traffic whereby the traffic may be readily controlled by a police-officer by pressing certain push buttons as hereinafter explained, signs bearing the words "Stop" and "Move" being exhibited as desired as signals for the regulation of the traffic.

My invention has other advantages hereinafter mentioned.

My invention consists in the combination and arrangement of parts shown in the accompanying drawings, described in the following specification and claimed in the appended claims.

In the accompanying drawings Figure 1 is a detail of the mechanism of said apparatus. Fig. 2 shows my street-traffic semaphore mounted and in the position of "Stop" with an arm raised. Fig. 3 represents a signal in the position of "Move". Fig. 4 is a view of the opposite side of the semaphore, showing the rod controlling the word "Stop". Fig. 5 shows the ground plan of the apparatus and the four signals 82, 83, 84 and 85 in position. X is the station of control and the arrows indicate streams of traffic. Fig. 6 is a plan view of the push-button control and Fig. 7 is a diagrammatic view of the push-button control. Fig. 8 is a sectional view showing armature winding 103, insulation 104, and laminated iron armature core 5. Fig. 9 is a cross section of arm 56, segment 33 and minor parts in connection therewith as hereinafter mentioned.

In the drawings numerals 1, 2 and 3 indicate field magnets.

4 represents a fiber base containing a suitable commutator, said commutator having insulated gaps 6.

5 indicates a laminated core, and 7 and 8 are laminated field cores.

9 is an insulated fiber base.

A push-button lead wire 10 is in connection with and controlled by push-button 16, and a lead 14 is in connection with and controlled by push-button 17. A common return wire lead 15 is in connection with the push-buttons as shown. The apparatus is provided with feed wires 11 and 12. The wire 10 is provided with tap wires 51 and 52 extending to fixed magnetic fields 1 and 2 as shown in Fig. 1.

The field or armature which contains the commutator 4 is movable. A vibrating horn having cylinder 18 is fixed to the bottom of housing 43 and has within its lower section a thin iron diaphragm 19 connected to its wall. A field core 20 is in connection with magnet 3. An armature 21 is engaged by a stop 22 and also by the catch 24. The brackets 23 support field magnet 3 and to one of which is connected stop 22 as shown. A bracket 25 pivotally supports catch 24, said catch having a spring-wire connecting it to housing 43, said spring-wire being designated 26. Brushes 27, 28, 29, 30 and 31 are secured to base 9 by screws as shown. Segments 32, 33, 34, 35, 36, 37, 38, 39, 40 and 41 are shown in Fig. 1 and said segments are energized in the operation as hereinafter set forth. A bracket 42 is secured to housing 43 and supports field magnets 1 and 2.

The apparatus is provided with fuse blocks 44, and has lead wires 46 and 47 to movable field connected as shown.

48 and 49 are switch wires to red and green lights.

50 represents a common return wire to the lamps. Lead wires 53 and 54 extend from fields 1 and 2 to brushes 27 and 29 as shown. The bracket 55 bears combination arm and conduit 56 pivotally connected thereto. The push-rod 57 controls the piece bearing the word "Stop" hereinafter mentioned and is pivotally connected to bracket 60.

58 designates a green lamp and 59 a red lamp. 61 indicates a catch secured by screws as shown and 62 a conduit tube with wires to lamps 58 and 59. A socket housing 63 is provided for lamps 58 and 59. The hinged arms for signaling are designated 66. A sliding piece 78 contains the word "Stop" and a fixed piece 79 contains the word "Move." A slot 70 in the panel of arms 66 is provided for pin 87. For supporting the signaling device posts 82 are provided. The brush 27 runs on the uncharged segment 40 and brush 29 runs on the charged segment 37, and the effect of this is that field 1 is cut out and field 2 thrown in, consequently drawing down on the armature until the catch 61 is caught by the dog 24.

The field 2 is automatically cut out by the brush running on the uncharged segment 89 and when the semaphore reaches a horizontal position the button is released by the operator. As the blade is rising the horn is blown automatically once and which is effected in the following way: As the armature comes down the brush 30 slides from the segment 36 and upon the segment 35, whereby the circuit containing the field 3 is closed, causing the horn to blow until the brush 30 passes upon the segment 34. In the nighttime switch 91 being turned on allows the current to pass by wire 93 to the return wire 50, which is tapped to the red and green lamps mentioned. When the blade 66 is down the current is supplied to the green light by means of the brush 31, charging the segment 32 which is connected by the wire 49, the latter in turn being connected to the green lamp. As the blade 66 rises the brush slides off segment 32 and upon segment 33, segment 33 being connected by wire 47 to the red light.

The movable field is held up as shown in Fig. 1 by the weight of the semaphore arm or blade 66. If it is desired to raise the blade to the position of "stop," the button 17 should be pressed—this act allowing the electric current to pass over wire 15, through the contacts on button 17 by wire 10 to wire 47, thence through the field to which said wire leads, and thence through wire 46 to the connection of wire 11. Field 1 is simultaneously charged, being tapped to wire 10 by connection 51, the current passing through said field being conducted by wire 53 to brush 27 over commutator segment 41 to segment 39 and brush 28 to wire 11. The field and armature being charged causes the armature to be drawn downward until the brushes 27 and 29 meet the insulated gaps 6. The segments are secured to the base 4.

In the operation, as the armature is being drawn up into the "stop" position, the push-rod 57 simultaneously pulls the shutter 78 containing the word "Stop" so that it shows through the opening. Having the signal in the position of "stop," and it being desired to put it into the position of "move," the button 16 should be pressed; whereupon it is released, this operation causing the horn to blow once and simultaneously causing the dog 24 to release the catch 61. The dog 24 will be pulled backwardly by the field 3 acting on the armature 21. The armature is carried upwardly by the weight of the semaphore blade and in its ascent the horn is blown again by the brush 30 closing the horn circuit as it passes over the segment 35 of the commutator and whereby two blows of the horn are effected as the blade of the semaphore drops. As the semaphore blade drops the shutter 78 is pushed backwardly by the push-rod 57, exposing the word "Move."

The box containing the mechanism may be used for containing the name of the street or its number.

An upper field core 120 is provided for magnet 3.

The apparatus in operation serves as a visible warning and at the same time as an audible one. By its use four ways of traffic can ordinarily be controlled, and where three streets meet six ways of such traffic may be controlled, instead of but two ways in the old system. It can be used as well at night as in the daytime.

The wire 49 leads from segment 33 on the commutator to the red lamp hereinbefore mentioned and the wire 48 is connected to the back of segment 33.

The commutator segments 32, 33, 34, 35, 36, 37, 38, 39, 40 and 41 are held in the base of fiber 4 by the screws 150. Wires 46 and 47 are fastened to segments 32 and 33 by the screws 150 for conveying current.

46 indicates a spiral wire leading from binding post 109 to armature coil 103. An insulating strip of mica 6 is placed as illustrated. Heavy laminations are represented by figure 151, the same being used for fastening arm 56 thereto. Suitable brass side plates 160 have part 4 secured thereto by screws 102. A suitable bracket 100 is provided as illustrated. Brushes 27, 28, 29, 30 and 31 are secured to base 9. An electric push button conductor wire 10 leads from push button contact 112 to the fields 1 and 2 and the armature winding 103. An electric push-button conductor 14 connects field 3 and the brush 30 to contact 114. Screws 102 hold the commutator to the armature as shown. Holder 9 is secured to bracket 100 by screws 110. 15 is an electric feed wire to push-button spring contact 111. 16 and 17 are push-buttons on spring 111 supported on base 101, and having connections therefor as shown, including parts 112 and 114 for wires 10, 14 and 15.

Insulation is indicated by parts 104, 105, 106, and 107, and 115 represents a screw securing the dog to armature 21.

A particular description of the operation of my apparatus is as follows: By pressing down on push-button 16 and holding the same down the circuit through armature coil 103 and field coil 1 is closed, the said circuit being from feed wire 12, over part 15, through spring contact 111, over contact 112, by wire 10, through coil 1 by wire 51, over wire 53, by brush 27 to commutator segment 41, then back over segment 39 to brush 28, then by wire 11 to the source of electrical supply by wire 11. The current passing through the field core 1 and the armature coil 103 causes the laminated cores 5 and 7 to become magnetized, thereby causing the armature with its coil and commutator to be swung downward on the bearing 55 until the cores 5 and 7 are nearly opposite each other, and as coil 5 is coming into a position nearly opposite to coil 7 the insulating strip 6 dividing or insulating part 41 from part 40 passes under the brush 27, said brush 27 riding on the strip 40 and having no electrical connection with the circuit and being insulated, the circuit is broken or opened through coil 1 simultaneously the brush 29 passes off the insulating clip 38, it having no electrical connection, and also being insulated from the section 37 by the insulating strip 6 passing on to the strip 37, the circuit is closed through the coil 2. Field coil 2 magnetically attracting the armature causes it to be still kept in motion and drawn downwardly until the hook 61 catches under the dog 24. Tracing the circuit through the field coil 2 when thrown in by the commutator the same passes by wire 15 from the source of electrical supply in wire 12, then through contact spring 111 and through contact point 112, by wires 10 and 52, through the coil 2 by wire 54, by brush 29, by commutator segment 37 to segment 39, by brush 28 to wire 11, the latter being one of the wires of the source of electrical supply. As the catch 61 engages dog 24, brush 28 is placed in the position of resting on the segment 89 by the downward movement of the commutator, segment 89 having no electrical connection and being insulated from the segment 39 by the insulating strip 6 causes the circuit through the armature and the coil 2 to be opened, thereby saving the operator the trouble of ascertaining when to release the pressure on the push-button 16 when the armature has traveled its full course, and it also automatically opens the circuit. When the armature is in the position last mentioned it holds the semaphore blade in the horizontal position or in the position of stop. There is also another operation which takes place when the arm is being carried up from the position of "move" to the position of "stop," namely the horn blows once and the green light goes out, while the red light appears. The horn blowing once is a signal to stop, while the red light is also a signal to stop. The operation of the apparatus for the last mentioned results is as follows:—For the blowing of the horn, one of the wires to the source of electrical supply 12 being connected to the brush 31, the said brush rests on the commutator segment 32, brush 30 resting on the insulated segment 36, said segment 36 being separated from segment 35 by the insulating strip 6. As the commutator is carried downwardly by the armature, brush 30 passes on to the segment 35, closing the circuit through the coil 3 and causing the horn to blow. The alternating current passing through the coil electrically induces the iron diaphragm to vibrate, thereby producing the horn blow. The circuit for the last-mentioned operation passes over wire 12, brush 31, segment 32, segment 35, brush 30, wire 14, through coil 3, then to wire 11, completing such circuit, and as the commutator passes farther down the circuit is opened by the brush 30 passing on to the insulated segment 34, it having no electrical connection, but being used as a riding strip only. Simultaneously on the downward movement last mentioned the green light in the position of "move" is switched off and the red light appears. The lamp circuit while in the position of "move" is by wire 12, brush 31, segment 32, over wire 49, it being connected to the back of segment 32, through the green lamp, back over the common return wire 50 to the binding post 108, wire 93, through switch 91, by wire 92, binding post 109, wire 116, and wire 11, thus completing the circuit. As the armature is carried downwardly the brush passing on to the segment 33 opens the circuit lighting the green lamp, and closes the circuit lighting the red lamp. The last mentioned circuit is by wire 12, brush 31, segment 33, by wire 48, it being connected to the back of segment 33, then through the red lamp, by common return wire 50 to the binding post 108, by wire 93, through switch 91, wire 92, binding post 109, wire 116 to wire 11, thus completing the circuit. When the semaphore blade shown is in the position of "stop" or extending horizontally, and the operator wishes to put said blade in the position of "move," he pushes the button 17, thereby releasing it. While he is pressing the last-mentioned button the following circuit is closed, namely: From wire 12 over wire 15, spring contact 11, contact point 114, wire 14, through coil 3 to wire 11. completing the circuit. The current passing momentarily through the coil 3 causes the dog armature 21 to be drawn down on the dog 24, releasing the catch 61 and causing the armature to move upwardly, such movement being caused by gravity, as the semaphore blade is heavier than the armature and its attachments. Simultaneously when said button, last mentioned, is being pressed the horn blows once by reason of the coils causing induction on the diaphraghm 19, and as the armature passes upwardly the brush 30 passing over the segment 35 closes the circuit again through the coil 3 causing the horn to blow again—two blows of said horn signaling "Move." The "second blow" circuit is wire 12, brush 31, segment 32, then to part 35, over brush 30, wire 14, through coil 3 to wire 11, thus completing the circuit. In the last-mentioned upward movement of the armature occurs the switching off of the red lamp and the turning on of the green lamp as follows: The red lamp being on and its circuit being wire 12, brush 31, segment 33, wire 47, through the red lamp by the common return wire 50 to part 108, over wire 93, through switch 91, over wire 92, to post 109, over wire 116 to wire 11, completing the circuit, and as the armature passes upwardly the brush passes off the segment 33 to the segment 32, thus forming the following circuit and turning on the green lamp, namely wire 12, brush 31, segment 32 to wire 49, through the green lamp, by common return wire 50 to post 108, by wire 93, through switch 91, by wire 92 to post 109, over wire 116 to wire 11, completing the circuit.

I claim:

1. In apparatus for controlling street-traffic the combination with a post, of a housing affixed to said post, a movable base having one edge provided with a laminated core and a fixed catch, a channeled arm pivoted to said housing and supporting said base, field magnets secured to said housing and having cores engageable with said core of said base, separated segments secured to said base, a plurality of brushes separately engageable with said segments, an insulated base secured in said housing and supporting said brushes, means in connection with said magnets and said brushes for electrically feeding said brushes, a pivoted catch having an armature resiliently connected to said housing, a magnet having an upper core and a lower core, said upper core being engageable with said armature, a horn provided with a diaphragm oppositely positioned to said lower core, said diaphragm being in proximity to said lower core, a rod pivoted to the cylinder of said horn, a semaphore blade supported by said channeled arm and provided with a plurality of electric lamps and said blade having a longitudinal slot containing a pin affixed in the outer end of said rod, a switch affixed to said housing, a lead wire from the movable field having connection with said switch and also with one of the said brushes, a common return wire and switch wires running through said channeled arm in connection with said lamps, a fuse block having electrical connection with a plurality of said brushes, means electrically connecting one of said magnets with one of said brushes, means for manually actuating the signals, and a slide movably secured by said blade and in connection with said rod.

2. In apparatus for controlling street-traffic the combination with a post of a frame affixed to said post, a movable base in said frame having one edge provided with a core and a catch, an arm pivoted to said frame and supporting said base, magnets secured to said frame and having cores engageable with said core of said base, separated segments secured to said base, a plurality of brushes separately engageable with said segments and secured in said frame, means for transmitting current connecting said magnets with said brushes, a resilient catch having an armature secured in said frame, a magnet in said frame having an upper core and a lower core, said upper core being engageable with said armature, a horn provided with a diaphragm oppositely positioned and in proximity to said lower core, electric connection between the said magnet and armature last-mentioned, a semaphore blade carried by said pivoted arm and having a longitudinal slot and a slide movably secured thereto, a pivotally secured push-rod in connection with slide and working in said slot, a switch affixed to said frame, electrical connection between said movable base and field and said switch and one of said brushes, a means electrically connecting the magnet last-mentioned with one of said brushes, and means for manually actuating said apparatus for the movement of said slide and the sounding of said horn.

3. In apparatus for controlling street traffic the combination with a post of a frame affixed to said post, a movable base in said frame having one edge provided with a core and a fixed catch, a channeled arm pivoted to said frame and supporting said base, magnets secured to said frame and having cores engageable with said core of said base, separated segments secured to said base, a plurality of brushes separately engageable with said segments and secured in said frame, means for transmitting current connecting said magnets with said brushes, a resilient catch having an armature secured in said frame, a magnet in said frame having an upper core and a lower core, said upper core being engageable with said armature, a horn provided with a diaphragm oppositely positioned and in proximity to said lower field core, electric connection between the said magnet last mentioned and armature, a semaphore blade carried by said pivoted arm and having a slot and provided with a plurality of electric lamps, a pivotally secured rod working in said slot, a switch affixed to said frame, electrical connection between said movable base and field and said switch and one of said brushes, a fuse block having electrical connection with a plurality of said brushes, means electrically connecting the magnet last-mentioned with one of said brushes, means conveying currents to said lamps, and means for manually actuating said apparatus for the lighting of said lamps and the sounding of said horn.

In testimony whereof I affix my signature in presence of two witnesses.

JOHANN G. WALLMANN.

Witnesses:
T. E. STANLEY,
R. H. PITMAN.